US012754726B2

(12) United States Patent
Malhotra et al.

(10) Patent No.: US 12,754,726 B2
(45) Date of Patent: Oct. 6, 2026

(54) MACHINE LEARNING BASED CODE MIGRATION ENGINE

(71) Applicant: ExlService Holdings, Inc., New York, NY (US)

(72) Inventors: Swati Malhotra, Toronto (CA); Shubham Jain, London (GB)

(73) Assignee: ExlService Holdings, Inc., New York, NY (US)

( * ) Notice: Subject to any disclaimer, the term of this patent is extended or adjusted under 35 U.S.C. 154(b) by 300 days.

(21) Appl. No.: 18/680,772

(22) Filed: May 31, 2024

(65) Prior Publication Data

US 2025/0370725 A1 Dec. 4, 2025

(51) Int. Cl.

| | |
|---|---|
| ***G06F 8/35*** | (2018.01) |
| ***G06F 8/51*** | (2018.01) |
| ***G06F 40/30*** | (2020.01) |
| ***G06N 20/00*** | (2019.01) |
| *G06Q 10/10* | (2023.01) |
| *G06V 10/778* | (2022.01) |

(52) U.S. Cl.
CPC .................. *G06F 8/51* (2013.01); *G06F 8/35* (2013.01); *G06F 40/30* (2020.01); *G06N 20/00* (2019.01); *G06Q 10/10* (2013.01); *G06V 10/778* (2022.01)

(58) Field of Classification Search
CPC ........... G06F 40/30; G06F 8/51; G06Q 10/10; G06V 10/778; G06N 20/00
See application file for complete search history.

(56) References Cited

U.S. PATENT DOCUMENTS

| | | | | |
|---|---|---|---|---|
| 11,516,158 | B1 * | 11/2022 | Luzhnica | G06F 40/30 |
| 2024/0378870 | A1 * | 11/2024 | Cheng | G06V 10/778 |
| 2025/0238433 | A1 * | 7/2025 | Sussman | G06Q 10/10 |
| 2025/0298798 | A1 * | 9/2025 | Kane | G06N 20/00 |

* cited by examiner

*Primary Examiner* — Tuan A Vu
(74) *Attorney, Agent, or Firm* — Ashurst Perkins Coie US LLP

(57) ABSTRACT

The systems, methods, and computer-readable media disclosed herein relate generally to machine learning based code migration engines. In an example, a code generator can generate input chunks using legacy code, use the input chunks to generate a prompt, use the prompt to cause a neural network to generate output code, and monitor the output window size of the neural network. To ensure conversion accuracy and minimize code truncation, the code generator can progressively adjust the output window size of the neural network and/or progressively adjust the size of input chunks while preserving internal integrity of code units in the chunks.

20 Claims, 9 Drawing Sheets

MACHINE LEARNING BASED CODE MIGRATION ENGINE

TECHNICAL FIELD

The systems, methods, and computer-readable media disclosed herein relate generally to machine learning based code migration engines.

BACKGROUND

Challenges presented by legacy code include difficulties in maintenance and modification, security vulnerabilities, resource constraints (e.g., inefficient use of memory), and cost of maintenance. Legacy code migration is the process of moving old programming code to a new platform or rewriting an existing product in a different programming language or in a different variant of the source programming language. Enterprise-scale code migration can be expensive and error-prone.

Figure 1:
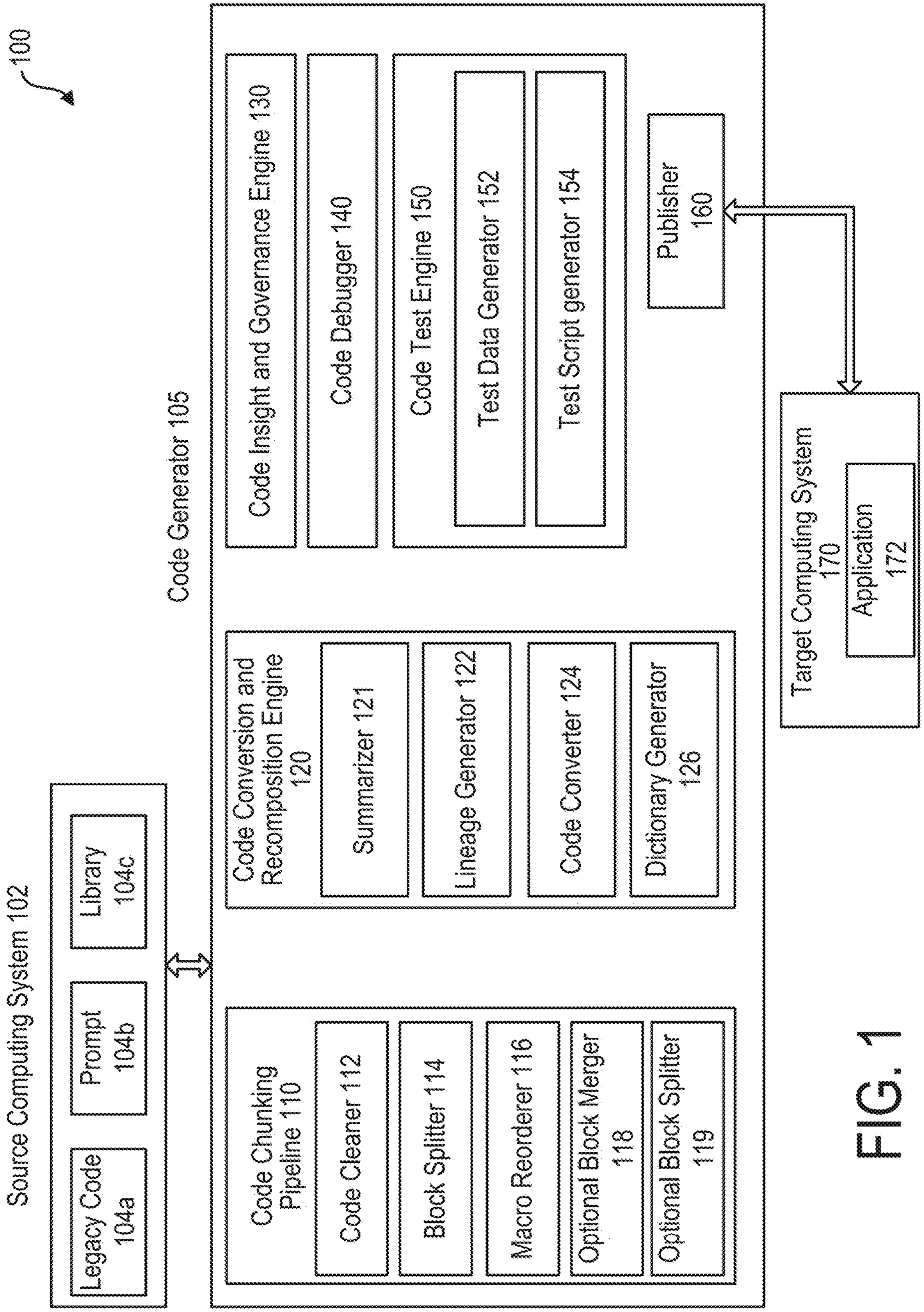
FIG. 1 shows an example computing environment that includes a code generator in accordance with some implementations of the present technology.

The drawings have not necessarily been drawn to scale. For example, some components and/or operations may be separated into different blocks or combined into a single block for the purposes of discussion of some of the embodiments of the disclosed system. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents and alternatives falling within the scope of the technology as defined by the appended claims.

DETAILED DESCRIPTION

Disclosed herein are systems, methods and computer-readable media for enterprise-scale machine learning based code migration. The techniques discussed herein present a number of technical advantages. For example, even if trained, neural networks that generate computer code may not be able to accurately generate code for previously unencountered scenarios. To solve this technical problem and improve accuracy of generated code, the techniques discussed herein can include advanced prompt engineering techniques, which can include neural network sequencing to extract contextual data. The contextual data can be used to generate one- or few-shot prompts to enable neural networks to dynamically discover code context and output requirements. As another example, neural networks may not be able to efficiently (e.g., without degradation in performance) generate output code that is normalized or otherwise improves upon the source code without sacrificing code dependencies or other measures of code integrity. To solve this technical problem, the techniques discussed herein can include intelligent code chunking, compression, and resequencing techniques. As yet another example, neural networks may not be natively suited to tailoring the size of generated code outputs to token window requirements, which can result in delays in generating code outputs or in code truncation. The techniques discussed herein include the ability to dynamically manage code outputs by initially setting and progressively reducing the output size window, where, to ensure consistency of outputs, the input code is refactored (e.g., input code chunks are reorganized or restructured to ensure they maintain internal integrity and do not represent partial code units). The code-generative neural networks can be iteratively applied to progressively smaller input chunks to generate quality output code.

Example Embodiments of a Machine Learning Based Code Migration Engine

FIG. 1 shows an example computing environment 100 that includes a code generator 105 in accordance with some implementations of the present technology. The code generator 105 can enable computer-based operations for AI/ML based code migration from a first programming language (e.g., a source language) to a second programming language (e.g. a target language). As used herein, the term "source language" can refer to a programming language for a code base to be converted to a "target language". Examples of source languages can include Hive, SAS, BTEQ, DataStage, VB.Net, Oracle SQL, COBOL, R, and Ab Initio. Examples of target languages include BigQuery, Python, Pyspark, SAS Viya, Redshift SQL, C #, Java, and Scala. One of skill will appreciate that the code generator 105 and its trained AI/ML models, described further herein, can support conversion from another source language to another target language not expressly mentioned above. For simplicity and without limitation, the use cases described herein will, unless otherwise specified, utilize SAS as an example source language and Python as an example target language. However, terminology utilized herein (e.g., macro, procedure, context) is not intended to be limited to use in relation to these languages. Rather, the terminology is intended to be used in a broader sense as conventionally understood by one of skill in the art.

As shown, the computing environment 100 includes one or more of a source computing system 102 and one or more of a target computing system 170. These systems can be communicatively coupled to the code generator 105 via a network. Each of the source computing system 102, target computing system 170, and code generator 105 can each include various components, including one or more processors, memory modules, transceivers, network interfaces, databases, executable files (in binary form and/or in compiled form), libraries of executables, file structures, and so forth.

In some implementations, any of the source computing system 102, target computing system 170, and code generator 105 can be distributed across more than one computing devices. For example, a particular instance of the code generator 105 can be deployed as an executable environment available to a subscriber entity (e.g., an entity associated with a particular target computing system 170) in a cloud-based environment, such as, for example, in a virtual private cloud, via a virtual network, in DaaS (data-as-a-service) computing environments, Saas (software-as-a-service) computing environments, PaaS (platform-as-a-service) computing environments, IaaS (infrastructure-as-a-service) computing environments, and/or the like. Accordingly, the executable environment can be deployed as a container, a pod of containers, cluster of containers, or a dedicated computing grid in a cloud-based environment, which provides varying levels of process and data isolation to meet various levels of data privacy and regulatory standards. At a minimum, the cloud-based implementation infrastructure described herein allows (at the container level) for isolating application programming interface (API) calls and data workflows, which secures and isolates data streams and data stores of a particular entity (e.g., an entity associated with a particular source computing system 102 or target computing system 170).

The code generator 105 can acquire (obtain, receive, query, import, and so forth) inputs from one or more source computing systems 102. The inputs can include legacy code 104*a*, prompts 104*b*, and/or libraries 104*c*. In some implementations, the inputs can be acquired via queries from various data sources associated with source computing systems 102, such as one or more databases. In some implementations, the input items can be received from a file system (e.g., via an FTP process, data import process, or another similar process). The code generator 105 can include or be communicatively coupled to a target computing system 170. The target computing system 170 can include a computing system associated with an entity that runs a particular instance of the code generator 105. For example, the entity can utilize an instance of the code generator 105 that includes specifically trained AI/ML models to support migration of the legacy code 104*a* to the target computing system 170.

An example implementation of the code generator 105 can include a GUI configured to enable a developer to import, modify or create output code, legacy code 104*a*, prompts 104*b*, and/or libraries 104*c*. The libraries 104*c* can include configuration files and other support resources for the legacy code 104*a*. The code generator 105 can output automatically generated variants of the legacy code 104*a* in a target language and enable interaction with the output via an application 172 (e.g., a desktop application, mobile application, and/or web-based application deployed to or accessible via the target computing system 170). To that end, the application 172 can include user interfaces, such as those described in relation to FIGS. 2-4B, which can enable developers to invoke various executables of the code generator 105, interact with the output, and incrementally train the AI/ML models of the code generator 105.

As shown, the code generator 105 can include various engines, some of which can be omitted or combined according to various implementations. As used herein, the term "engine" can refer to one or more sets of computer-executable instructions, in compiled or executable form, that are stored on non-transitory computer-readable media and can be executed by one or more processors to perform software- and/or hardware-based computer operations. The computer-executable instructions can be special-purpose computer-executable instructions to perform a specific set of operations as defined by parametrized functions, specific configuration settings, special-purpose code, and/or the like. The engines can generate and/or receive various messages or data, such as legacy code 104*a*, prompts 104*b*, libraries 104*c*, model parameters (e.g., model weights), model training metrics and data structures (e.g., training data, or gradient information), information relating to model architectures (e.g., activation functions), and other suitable data. Whenever a particular input item is referred to in the singular form, one of skill will appreciate that more than one electronic command, file, message or dataset can be used to carry out the described operations. For example, a particular code module, dataset, record, or item therein can be broken down into multiple electronic messages.

As shown according to an example implementation, the various engines of the code generator 105 can include the code chunking pipeline 110, code conversion and recomposition engine 120, code insight and governance engine 130, code debugger 140, code test engine 150, and/or publisher 160. Generally, the code chunking pipeline can enable pre-processing and optimization of legacy code 104*a*, including generation of input features for the AI/ML models of the downstream engines of the code generator 105, such as the code conversion and recomposition engine 120, code insight and governance engine 130, code debugger 140, and code test engine 150. The code conversion and recomposition engine 120 can include computer executables and AI/ML models to optimize and convert chunks of source code or natural-language representations of source code to a target language. To that end, the code conversion and recomposition engine 120 can include computer executables to generate or translate code, generate code summaries, generate code explanations, generate code/variable lineages, and so forth. The code insight and governance engine 130 can include computer executables to optimize and programmatically evaluate the quality of the output (e.g., a unit of code in a target language). To that end, the code insight and governance engine 130 can include computer executables for generating code quality metrics and/or scores. The code debugger 140 can include computer executables to perform syntactical and/or logical debugging of the source code or target code. The code test engine 150 can include computer executables to generate synthetic test data or scripts using seed data automatically determined using the legacy code 104*a*, prompts 104*b* and/or libraries 104 in combination with the generated lineages, explanations or summaries.

In an example, the publisher 160 can include a programming layer (e.g., an application programming interface (API), a set of computer-executable commands). Items in the programming layer can be programmatically bound to user interface controls of the application 172 to enable developers to interact with the code generator 105.

Code Chunking Pipeline

The code chunking pipeline 110 can include computer executables configured to efficiently chunk a long segment of legacy code 104*a* into chunks at or under a token limit for a particular AI/ML model that generates the code (e.g., code converter 124). The token limit can be predetermined—for example, defined as output size (e.g., number of bytes, string length) and/or as token count (e.g., 4,096 tokens, 8,000 tokens). The token limit can also be dynamically determined to accommodate the size of the output. In some implementations, the initial token size limit is not expressly specified (infinite or indeterminable). To that end, the code chunking pipeline can execute operations to identify code blocks in the legacy code 104*a* and their types. If a particular code block is of a predetermined type (e.g., in a SAS use case, macro, data step, or proc step) and can fit into a chunk based on the chunk length, then the code chunking pipeline 110 can forgo splitting the legacy code 104*a*. Otherwise, the code chunking pipeline 110 can determine how to split the legacy code 104*a* without breaking logical flow of the legacy code 104*a*.

To determine how to split the legacy code 104*a* without breaking logical flow, the code cleaner 112 can preprocess the legacy code 104*a* and remove blocks of comments, including multi-line comments, such that token length is not wasted on non-code text. The block splitter 114 can parse the legacy code 104*a*, simulating compiler functionality, and identify start and end points of code blocks in the legacy code 104*a*. The block splitter 114 can then split the legacy code 104*a* into self-composed blocks for further evaluation against the token limit. The macro reorderer 116 can, after the self-composed blocks have been identified and parsed out from the legacy code 104*a*, identify blocks of a particular type (e.g., macros, functions and so forth), identify dependencies between these blocks, and re-sequence the blocks such that the calling blocks precede the blocks they invoke (e.g., when a macro calls another macro, when a function instantiates an object, and so forth). The optimal block merger 118 can identify blocks that are under the token limit and can be concatenated to balance the relative size of the tokens, increasing the degree of token uniformity in size. Accordingly, the optimal block merger 118 enables the technical advantage of optimizing the flow of inputs through the algorithms of the neural networks of code converter 124 by normalizing the size of input batches.

The optimal block splitter 119 can split blocks at specific points determined to be comparatively less likely to adversely impact the logic flow. For example, if a particular block exceeds the token limit, the optimal block splitter 119 can first identify the specific candidate split points (comments, line breaks, elements that are outside of nested structures, such as loops and if-then commands). The optimal block splitter 119 can then split the legacy code 104*a* along these points to generate tokens of conforming size.

Code Conversion and Recomposition Engine

The code conversion and recomposition engine 120 can utilize the code chunks generated by the code chunking pipeline 110 to generate code in a target language. To that end, the code conversion and recomposition engine 120 can include a code converter 124, which can be or include one or more code-generative neural networks (e.g., an LLM). The code conversion and recomposition engine 120 can apply sophisticated prompting logic, based on various properties of chunks and chunk context, apply neural network(s) to generate code in a target language, and manage output parameters of the neural network.

The code conversion and recomposition engine 120 can include computer instructions to select a particular prompt 104*b* from a prompt library. The prompt 104*b* can, in some instances, be parametrized using the chunks generated by the code chunking pipeline 110. The prompt 104*b* can include computer-executable instructions for the code converter 124 to generate code in a target language based on the pre-processed input (the chunks generated based on the legacy code 104*a*).

Advantageously, the code conversion and recomposition engine 120 can employ sophisticated logic to generate or parametrize prompts 104*b*, including generation of context-based prompts using the chunks, generation of chunk type-specific prompts, generation of prompt sets designed to enable neural network overloading (such that the neural network(s) of the code converter 124 are enabled to operate on different prompt variants for a particular output type), chain-of-thought reasoning/prompt chaining, and/or combinations of the above approaches.

In some implementations, the code conversion and recomposition engine 120 can generate context-based prompts 104*b* using the context determined using legacy code 104*a*. The context can refer to parameters and/or data associated with a particular target code unit that should be generated by the code converter 124. The context can be determined by parsing and chunking the legacy code 104*a*, and/or by referencing one or more libraries 104*c* (e.g., by referencing an XML file, a JSON file, a table, view or procedure in a database, and so forth). For example, a zero shot prompt 104*b* can be generated for a chunk that does not have dependencies on code units in preceding chunks and does not require data references (e.g., calls to a database or another data source). A zero shot prompt 104*b* can include context in situations where the chunk does not require dependencies on preceding code units but does reference a context item (e.g., makes a call to a database or another data source.) A one shot or few shot prompt 104*b* can be generated using a chunk that includes a dependency to a code unit (e.g., another chunk) and can additionally reference context items. Advantageously, the ability of the code conversion and recomposition engine 120 to generate one shot or few shot prompts 104*b* enables the neural network(s) of the code converter 124 to automatically learn about code or context dependencies on which the neural network(s) of the code converter 124 were not expressly trained. As a result, the code converter 124 can maintain the level of complexity and accuracy in the output code that was present in the target code and accurately maintain code and/or context dependencies.

In some implementations, the code conversion and recomposition engine 120 can generate context-based prompts 104*b* by determining a type of a particular chunk of code in a source language that is to be translated to code in a target language. For example, the code conversion and recomposition engine 120 can generate and include in the prompt 104*b* a set of keywords determined based on the type (e.g., to translate a particular code unit type, such as a macro, to a correct corresponding code unit type in a target language, such as a function).

In some implementations, the code conversion and recomposition engine 120 can apply a configuration file from the library 104*c* (e.g., a JSON file) to determine a particular variant of a trained neural network to execute by the code converter 124. The structure of the prompt 104*b* (e.g., body, command, keywords, parameters, instructions) can be determined based on the selected variant of the trained neural network. For example, two neural networks can be trained to generate substantially similar outputs for different types of source code chunks.

In some implementations, the code conversion and recomposition engine 120 can generate prompt sequences, apply chain-of-thought reasoning to generate a sequence of outputs for a particular chunk and to utilize intermediate outputs in downstream calls to the trained neural network(s) of the code converter 124. For example, for procedural SQL, the code conversion and recomposition engine 120 can first generate a first prompt 104*b* to cause the neural network to generate code that returns a set of table columns and then generate a second prompt 104*b* to cause the neural network to generate code that selects particular rows from the returned columns, where the returned columns are used to explicitly parametrize the second prompt 104*b* or where the second prompt 104*b* instructs the neural network to refer to the output generated using the first prompt 104*b*. Advantageously, such an approach enables source code compression by consolidating items in the legacy code 104*a*, where multiple instances of repeated code in the source language can be consolidated into one call, function or unit in the target language. Such an approach can optimize processor resources when the code in the target language is compiled or executed. Additionally, such an approach can enhance usability of trained neural networks even with limited training, where the neural networks may not be able to detect and recognize complex code dependencies or redundancies. Additionally, such an approach can speed up execution of neural network operations by enabling the flattening (reduction of layers) in the neural networks.

In some implementations, prompt sequences can enable the code conversion and recomposition engine 120 to perform optimization of the legacy code 104*a* converted to the target language. For example, the code conversion and recomposition engine 120 can optimize the chunks generated based on the legacy code 104*a*. Optimizing the chunks can include consolidating the chunks, segmenting the chunks, normalizing or otherwise restructuring the data dependencies based on context references in the chunks, and so forth. These operations can be based, at least in part, on retrieval-augmented techniques that can query the library 104*c* to retrieve optimization rules. Optimization rules can include algorithm optimization recommendations, data optimization recommendations (e.g., data normalization guidelines, size thresholds for data segmentation), scoring methodologies, and so forth. In some implementations, the algorithm optimization plans can be relationally linked to code outputs generated by the code converter 124 and can store automatically-determined performance metrics for variants of the outputs. Example performance metrics are discussed further below with respect to the code insight and governance engine 130 and code debugger 140.

Code Insight and Governance Engine

Prior to or after converting the code to a target language, the code conversion and recomposition engine 120 can perform various computer-based analytical operations on the source or target code, as described below. To that end, the code conversion and recomposition engine 120 can include or invoke various code insight and governance operations, described below. One of skill will appreciate that, although the code conversion and recomposition engine 120 and code insight and governance engine 130 are shown as separate components for simplicity, these components can be combined, and the various engines described with respect to these components (e.g., summarizer 121, lineage generator 122, dictionary generator 126) can be distributed across or accessible by the code conversion and recomposition engine 120 and code insight and governance engine 130 (or other suitable components).

Figure 2:
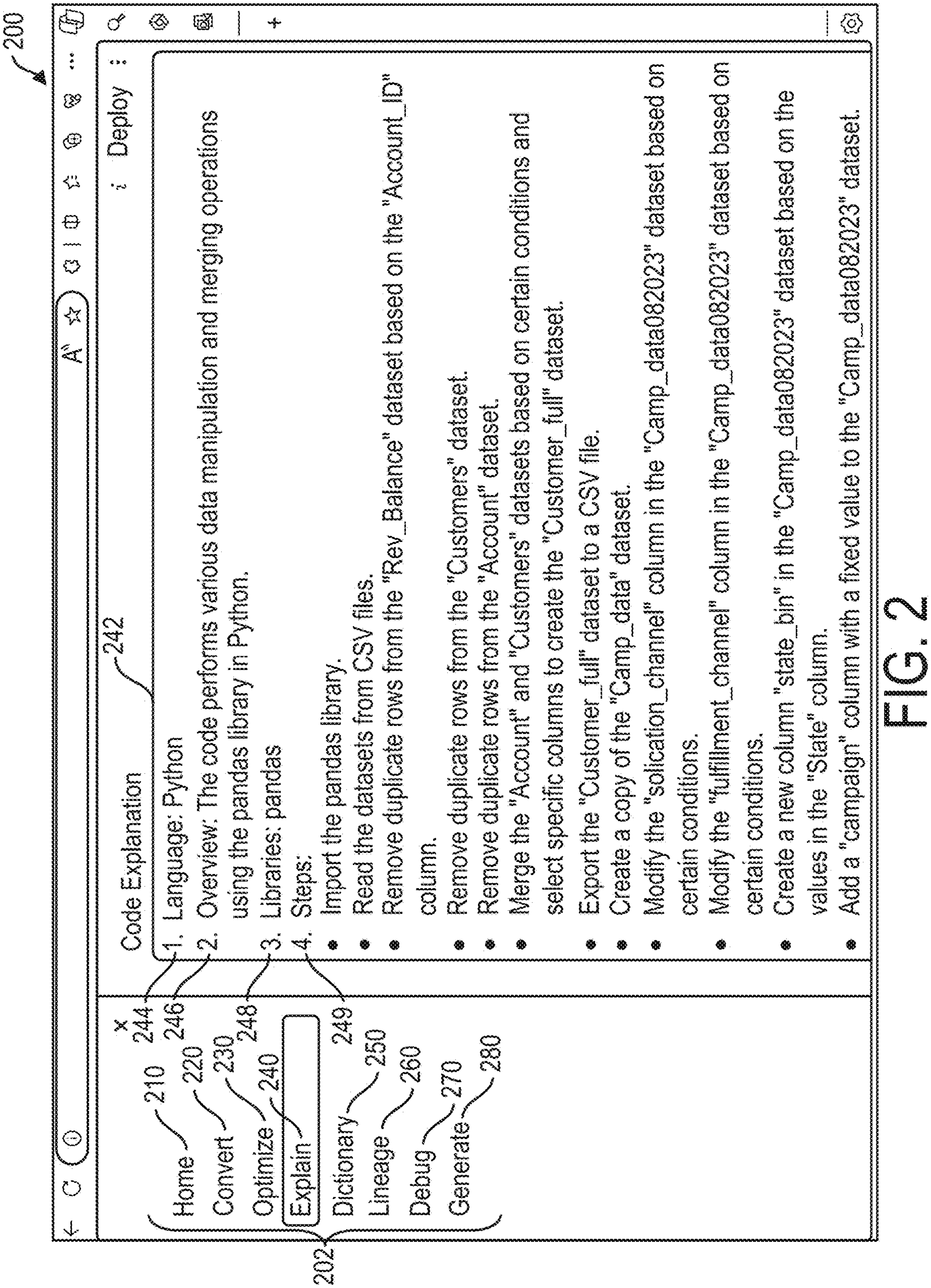
FIG. 2 shows an example graphical user interface (GUI) that demonstrates aspects of a code summarizer in accordance with some implementations of the present technology.

FIG. 2 shows an example graphical user interface (GUI) 200 that demonstrates aspects of a code summarizer 121 in accordance with some implementations of the present technology. As a general overview, the GUI 200 enables developers to interact with the code generator 105. The GUI 200 can include controls 202, which can enable developers to invoke various executables of the code generator 105. To that end, the controls 202 can include a home control 210, a convert control 220, an optimize control 230, an explain control 240, a dictionary control 250, a lineage control 260, a debug control 270, and/or a generate control 280.

In an example, the code summarizer 121 can be invoked via the explain control 240 to generate a code explanation unit 242. The code explanation unit 242 can include various automatically determined items, such as the detected language 244, overview 246, library identifiers 248, and natural-language steps 249. To generate these items, the code summarizer 121 can include one or more of a trained neural network that can receive a unit of code (either legacy code or output code in a target language) and perform static code analysis on the unit of code. To that end, the trained neural network can be invoked by the code summarizer 121 downstream of the code converter 124, using the output of the trained neural network of the code converter 124. The neural network can generate various summaries and scores, such as those described below.

The code summarizer 121 can analyze the code using static code analysis techniques and generate various output items. For example, a generated total lines value can refer to a total number of lines of code in the unit of code. Complexity grade can be a rank for the complexity score of the unit of code (e.g., A to F, where A stands for the simplest code and F the relatively more complex code). Maintainability grade can be a rank for a maintainability score (e.g., from A to C, where A is the best and C is the worst one). Complexity and/or maintainability grade can be determined based on additional code properties determined by the code summarizer 121. Some of these properties are discussed below.

Logical lines can refer to a number of lines where a logical operation is performed. Comments can refer to a count of commented or descriptive lines. Estimated time to program can be calculated based on effort, which can reflect statistically computed measures, such as Halstead scores. Vocabulary can refer to a total number of operators used in the unit of code. Length can refer to a total number of operands used in the program. Calculated length can refer to an expected length of the abstract syntax tree of the program, where the abstract syntax tree can be automatically generated as described further herein. Volume can refer to a total number of operations performed by a compiler while executing the unit of code. Difficulty can refer to a relative score of program readability and understanding. Effort can quantify developer effort. Estimated bugs can refer to a number of bugs estimated in development depending on volume of the code base.

The code summarizer 121 can generate various additional metrics, such as a cyclomatic complexity score. Cyclomatic complexity corresponds to the number of decisions in a unit of code plus 1. This score (also sometimes referred to as McCabe number) can therefore be representative of a determined number of linearly independent paths through the code. Cyclomatic complexity score can be used as a guide when testing conditional logic in units of code. The code summarizer 121 can also generate a maintainability index, which can be a factored (e.g., weighted) composite score based on the lines of code, cyclomatic complexity score, and/or Halstead score.

Figure 3:
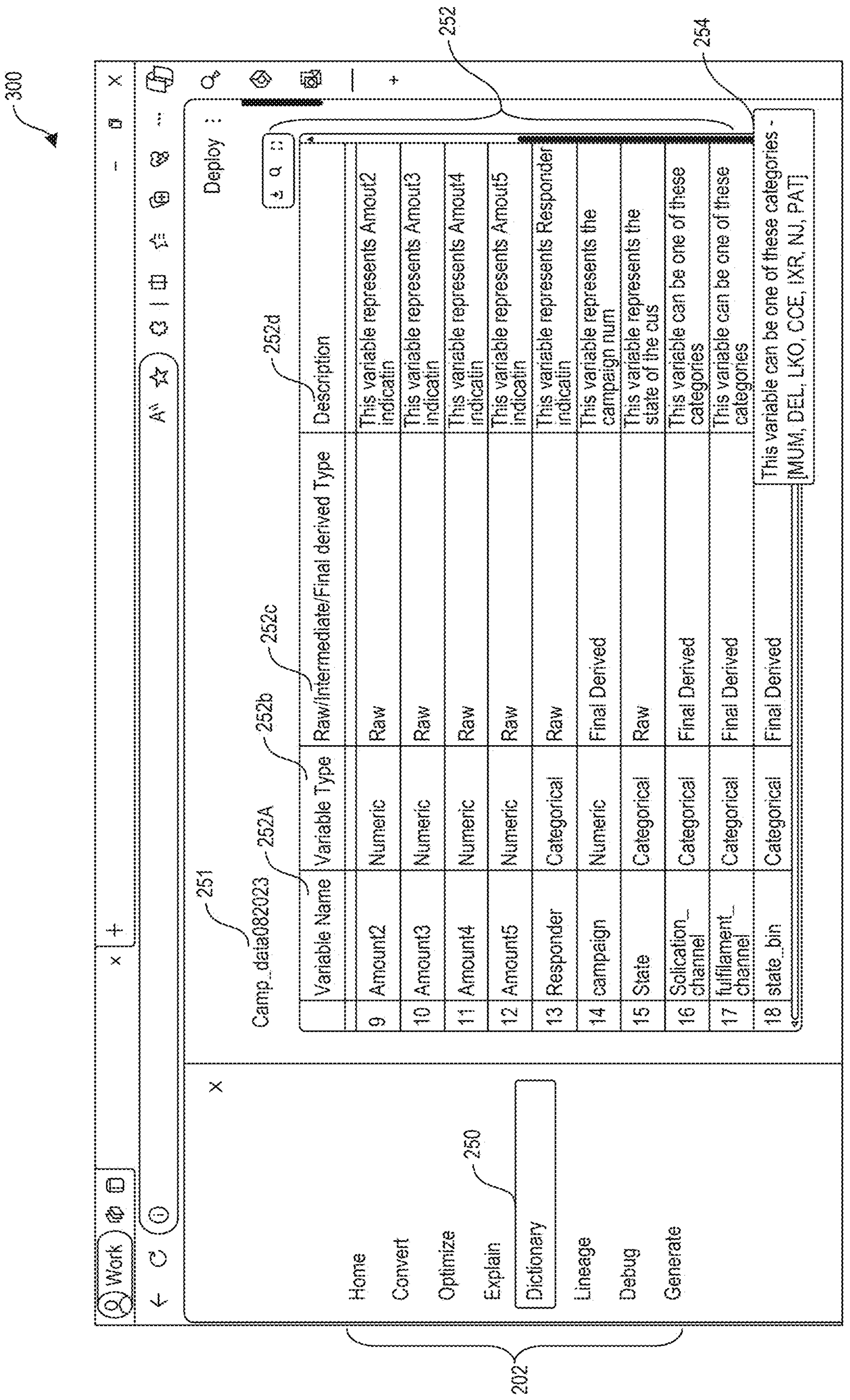
FIG. 3 shows an example GUI that demonstrates aspects of a dictionary generator in accordance with some implementations of the present technology.

FIG. 3 shows an example GUI 300 that demonstrates aspects of a dictionary generator 126 in accordance with some implementations of the present technology. The dictionary generator 126 can be invoked through the dictionary control 250. In an example discussed here, the dictionary generator 126 can be invoked to contextualize code or data in the extracted chunks (for example, prior to generating prompts 104*b* for the neural network(s) utilized by the code converter 124 to generate code in a target language). In another example, the dictionary generator 126 can be invoked to document references or dependencies in the target language code unit. In some implementations, the dictionary generator 124 can construct a separate prompt 104*b* or set of prompts 104*b* to apply trained neural networks to input items from the extracted chunks. For example, a first call to a first trained neural network of the dictionary generator 124 can provide a chunk as an input and receive as an output a structured file (e.g., JSON) listing entities 252 (e.g., tables, views, procedures) called by a code unit in the chunk. These items can be provided, in another prompt 104*b*, to a second trained neural network or computer executable that can provide details of the entities. The details can include a structured file entry 251 (title of the entity), variable name 252*a*, variable type 252*b*, derived variable state 252*c* (e.g., whether the variable is raw, intermediate, or derived), and/or variable description 252*d*. The variable description 252*d* can be populated with an automatically determined set of domain values 254. For example, the second trained neural network or computer executable can automatically parse the constraints on a SQL table definition to generate the set of domain values 254.

Figure 4A:
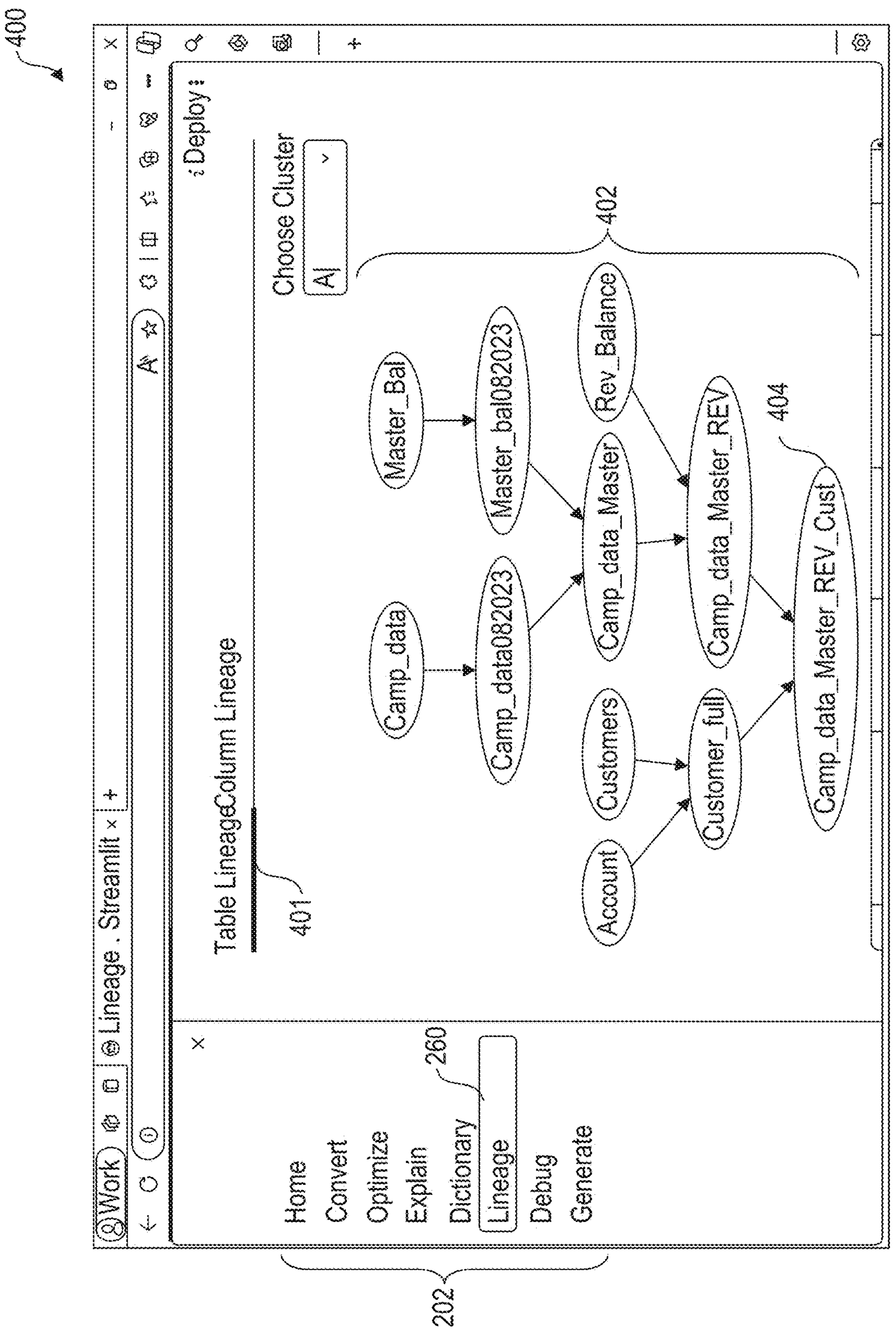
FIGS. 4A and 4B show example GUIs that demonstrate aspects of a lineage generator in accordance with some implementations of the present technology.
Figure 4B:
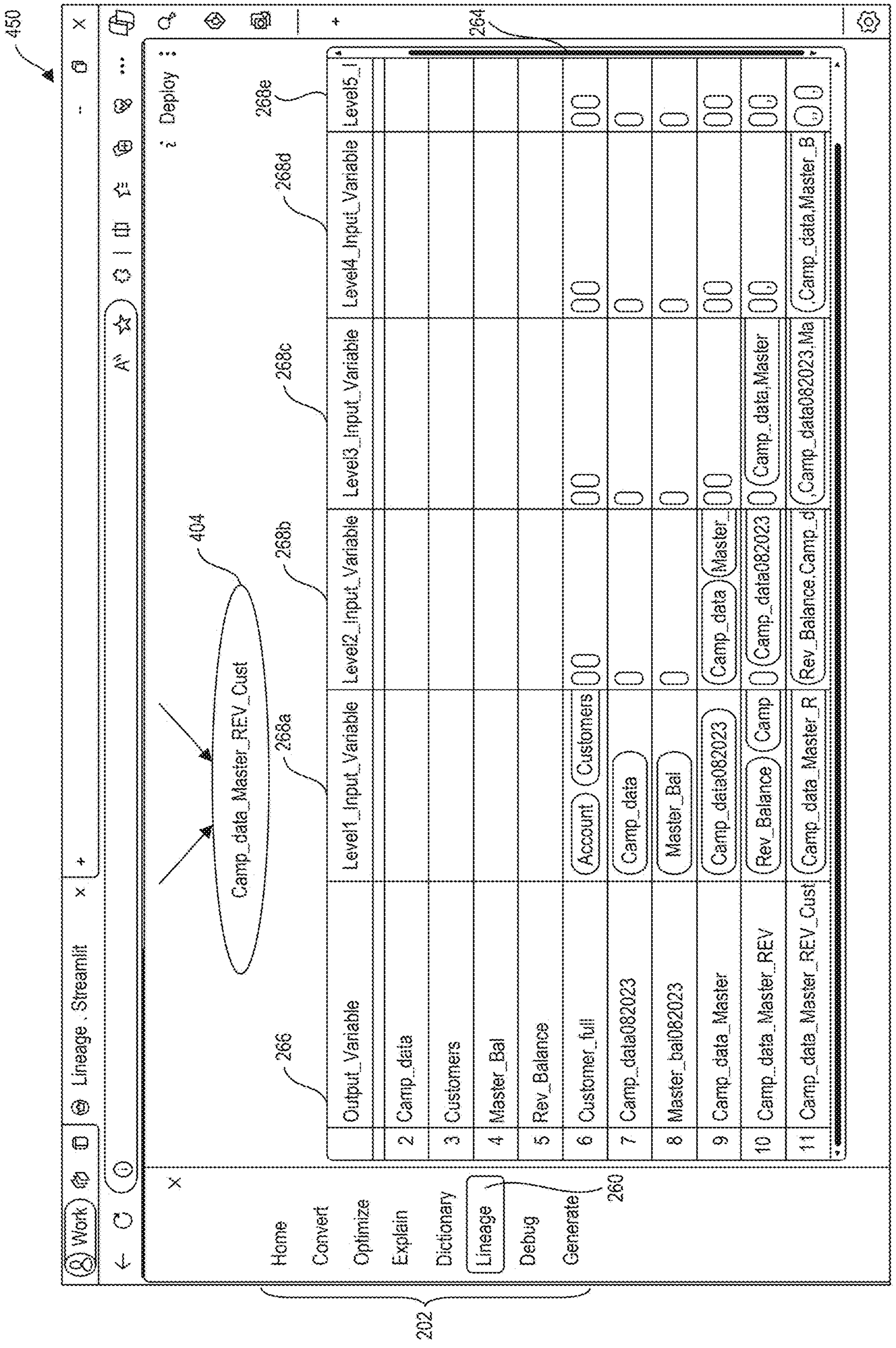

FIGS. 4A and 4B show example GUIs 400 and 450, respectively, that demonstrate aspects of the lineage generator 122 in accordance with some implementations of the present technology. Having visibility into different types of lineages, such as table lineage and/or column lineage, helps improve developer understanding of units of legacy code 104*a*. The lineage generator 122 can determine lineages using the previously extracted chunks. The chunks can be provided, as inputs, to trained neural networks and/or computer executables to determine lineages and relationships between entities. For example, the lineage generator 122, invoked via the lineage control 260, can apply a neural network to determine entity (e.g., table, column) names from the chunk, as described above. The lineage generator 122 can generate a visual representation 402 of entity lineages, which can include a set of nodes 404 and describe their data flows and dependencies. When a particular visual representation 402 is a higher-order representation (e.g., table lineage 401), the nodes can be developer-interactive. In response to an interaction (e.g., detecting a selection of the node via the GUI), the lineage generator 122 can generate a view 264, which can include attributes (e.g., columns 266) associated with the node. The attributes can include an automatically determined relational map between output variables 266 and input variables (268*a*-268*e*). The input variables can be automatically classified and color-coded as raw, intermediate and final derived variables. The lineage generator 122 can generate a set of variable relations (e.g., pairs) and traverse the set to determine higher-order variables. For example, row 10 in view 264 shows a relation of variables that successively contribute to the definition of the output variable 266, camp_data_master_rev.

Code Debugger

The code debugger 140 can include computer executables to perform syntactical and/or logical debugging of the source code or target code. The code debugger 140 enables developers to ensure that code is converted accurately. In an example, the code debugger 140 can generate a sensibility score, which is a metric used to measure the degree of similarity between a unit of the legacy code 104 and a unit of output code generated in a target language. The sensibility score (e.g., in a range of 0.0 to 1.0) can be generated by comparing the number of operations performed in each language. The number of operations can be determined using code vocabulary, code length or another suitable metric described herein. An indication of code migration quality (e.g., pass/fail, a numerical score) can be generated and displayed to the developer by comparing sensibility scores for legacy and target code. In some implementations, the sensibility score is scaled to account for compression or normalization (deduplication) of items in the legacy code 104*a*.

The code debugger 140 can perform additional operations, such as generating code summaries, described above. Further, the code debugger 140 can perform syntactical debugging of the output code by parsing the code into a displayable tree-like structure, where nodes are syntactical elements, such as functions, expressions, and so forth. The tree-like structure can be shown to the developer, via a display, along with a code editor. Further, the code debugger 140 can perform logical debugging by automatically comparing code summaries for units of legacy and target code. In some implementations, after performing the additional operations, the code debugger 140 can generate and display an updated sensibility score to enable developers to assess the quality of pre- and post-debugging output code.

Code Test Engine

The code test engine 150 can include computer executables to generate synthetic test data or scripts using seed data. For example, the test data generator 152 can be utilized to generate a diverse set of test data for testing the automatically generated output code in the target language. The test data generator 152 can discover sample data (as described, for example, in relation to the dictionary generator 126) and use the sample data as seed data to cause a trained neural network to generate additional seed data (e.g., using the few shot approach). Advantageously, using the few shot approach and providing examples of the discovered sample data enables the trained neural network to generate meaningful synthetic data even when the model was not expressly trained on the specific sample data. Additionally, the trained neural network can utilize the discovered metadata (e.g., data type) to validate the generated test data or identify intentional boundary or outlier cases, where test data is intended to cause the output code to fail. As another example, the test script generator 154 can be utilized to test the input/output equivalence of a unit of legacy code 104*a* and a unit of output code using synthetic test data generated by the test data generator 152.

Example Embodiments of AI/ML Models

Figure 5:
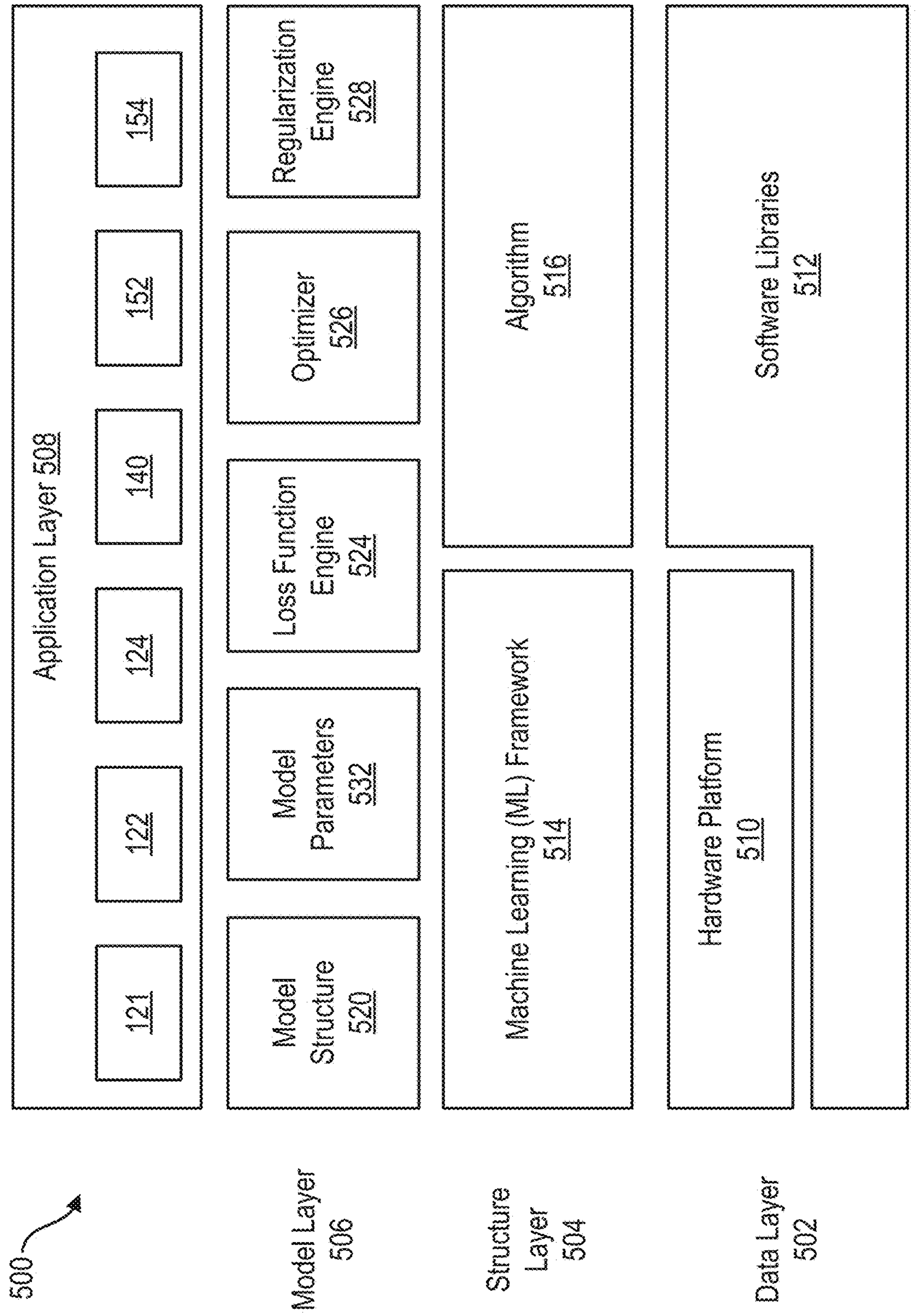
FIG. 5 illustrates a layered architecture of an artificial intelligence/machine learning (AI/ML) system that can implement the machine learning models of the code generator of FIG. 1, in accordance with some implementations of the present technology.

FIG. 5 illustrates a layered architecture of an artificial intelligence/machine learning (AI/ML) system that can implement the machine learning models of the code generator 105 of FIG. 1, in accordance with some implementations of the present technology. For example, the summarizer 121, lineage generator 122, code converter 124, code debugger 140, test data generator 152, and/or test script generator 154 can include some or all elements described in relation to FIG. 5.

As shown according to FIG. 5, the AI/ML system 500 can include a set of layers, which conceptually organize elements within an example network topology for the AI/ML system's architecture to implement a particular AI/ML model. Generally, an AI/ML model is a computer-executable program implemented by the AI/ML system 500 that analyzes data to make predictions. In the AI/ML model, information can pass through each layer of the AI/ML system 500 to generate outputs for the AI/ML model. The layers can include a data layer 502, a structure layer 504, a model layer 506, and an application layer 508. The algorithm 516 of the structure layer 504 and the model structure 520 and model parameters 522 of the model layer 506 together form an example AI/ML model. The optimizer 526, loss function engine 524, and regularization engine 528 work to refine and optimize the AI/ML model, and the data layer 502 provides resources and support for application of the AI/ML model by the application layer 508.

The data layer 502 acts as the foundation of the AI/ML system 500 by preparing data (e.g., legacy code 104*a*, prompt stubs 104*b*, libraries 104*c*) for the AI/ML model. As shown, the data layer 502 can include two sub-layers: a hardware platform 510 and one or more software libraries 512. The hardware platform 510 can be designed to perform operations for the AI model and can include computing resources for storage, memory, logic and networking, such as the resources described in relation to FIGS. 6 and 7. The hardware platform 510 can process amounts of data using one or more servers. The servers can perform backend operations such as matrix calculations, parallel calculations, machine learning (ML) training, and the like. Examples of servers used by the hardware platform 510 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI/ML applications due to their vast computing and memory resources. GPUs use a parallel structure that generally makes their processing more efficient than that of CPUs. In some instances, the hardware platform 510 can include Infrastructure as a Service (IaaS) resources, which are computing resources (e.g., servers, memory, etc.) offered by a cloud services provider. The hardware platform 510 can also include computer memory for storing data about the AI/ML model, application of the AI/ML model, and training data for the AI/ML model. The computer memory can be a form of random-access memory (RAM), such as dynamic RAM, static RAM, and non-volatile RAM.

The software libraries 512 can be thought of as suites of data and programming code, including executables, used to control and optimize the computing resources of the hardware platform 510. The programming code can include low-level primitives (e.g., fundamental language elements) that form the foundation of one or more low-level programming languages, such that servers of the hardware platform 510 can use the low-level primitives to carry out specific operations. The low-level programming languages do not require much, if any, abstraction from a computing resource's instruction set architecture, allowing them to run quickly with a small memory footprint. Examples of software libraries 512 that can be included in the AI/ML system 500 include Intel Math Kernel Library, Nvidia cuDNN, Eigen, and Open BLAS. In some implementations, a software library 512 can include executables to optimize performance of the summarizer 121, lineage generator 122, code converter 124, code debugger 140, test data generator 152, and/or test script generator 154.

The structure layer 504 can include an AI/ML framework 514 and an algorithm 516. The AI/ML framework 514 can be thought of as an interface, library, or tool that allows users to build and deploy the AI/ML model. The AI/ML framework 514 can include an open-source library, an application programming interface (API), a gradient-boosting library, an ensemble method, and/or a deep learning toolkit that work with the layers of the AI/ML system facilitate development of the AI/ML model. For example, the AI/ML framework 514 can distribute processes for application or training of the AI/ML model across multiple resources in the hardware platform 510. The AI/ML framework 514 can include a set of pre-built components that have the functionality to implement and train the AI/ML model and allow users to use pre-built functions and classes to construct and train the AI/ML model, such as the pre-built functions that facilitate operations of the summarizer 121, lineage generator 122, code converter 124, code debugger 140, test data generator 152, and/or test script generator 154. Thus, the AI/ML framework 514 can be used to facilitate data engineering, development, hyperparameter tuning, testing, and training for the AI/ML model.

The algorithm 516 can be an organized set of computer-executable operations used to generate output data from a set of input data and can sometimes be described using pseudocode. The algorithm 516 can include program code that allows the computing resources to learn from new input data and create new/modified outputs based on what was learned. More specifically, the algorithm 516 can include computer-executable code to enable the operations of the summarizer 121, lineage generator 122, code converter 124, code debugger 140, test data generator 152, and/or test script generator 154. Accordingly, the computer-executable code can generate code summaries, lineages, snippets, error indications, test data, and/or test scripts.

The algorithm 516 can build the AI/ML model by being trained while running computing resources of the hardware platform 510. The training allows the algorithm 516 to make predictions or decisions without being explicitly programmed to do so. For example, training data can include initial training data sets that include syntactical maps of code elements (declarations, logic controls, computations, operations, value assignments, summaries), chunk definitions, sensibility scores, data types for generating test data, code snippets for generating test scripts, macros, prompt elements for generating code snippets, or combinations thereof. Throughout operation of the code generator 105, the output of AI/ML operations executed by trained models can be provided to a target computing system 170 (e.g., a test/training system), which can enable power users to review outputs, generate new relationships between input elements, generate and feed additional training data to the models for incremental training, and so forth. For instance, in an example use case, the outputs can include input/output equivalents of legacy code 104*a* and output code, and the power users can utilize a GUI of the target computing system 170 to generate additional input/output equivalents (for example, by mapping additional example inputs to a particular output, by editing a syntax element or order of elements in the output). The additional input/output equivalents can be utilized to incrementally train the models to improve their generative capacity.

The model layer 506 can implement the AI/ML models using data from the data layer and the algorithm 516 and AI/ML framework 514 from the structure layer 504, thus enabling decision-making capabilities of the AI/ML system 500. The model layer 506 can include a model structure 520, model parameters 522, a loss function engine 524, an optimizer 526, and/or a regularization engine 528.

The model structure 520 describes the architecture of the AI/ML models of the AI/ML system 500, such as the models executed by the summarizer 121, lineage generator 122, code converter 124, code debugger 140, test data generator 152, and/or test script generator 154. The model structure 520 defines the complexity of the pattern/relationship that the AI/ML model expresses. Examples of structures that can be used as the model structure 320 include decision trees, support vector machines, regression analyses, Bayesian networks, Gaussian processes, genetic algorithms, and artificial neural networks (or, simply, neural networks, such as large language models).

An example AI/ML model implemented by the summarizer 121, lineage generator 122, code converter 124, code debugger 140, test data generator 152, and/or test script generator 154 can be a neural network. In such cases, the model structure 520 can include a number of structure layers, a number of nodes (or neurons) at each structure layer, and activation functions of each node. Each node's activation function defines how to node converts data received to data output. The structure layers may include an input layer of nodes that receive input data, an output layer of nodes that produce output data. The model structure 520 may include one or more hidden layers of nodes between the input and output layers. Additional examples of neural networks include Feedforward Neural Networks, convolutional neural networks (CNNs), Recurrent Neural Networks (RNNs), Autoencoders, and Generative Adversarial Networks (GANs).

The model parameters 522 represent the relationships learned during training and can be used to make predictions and decisions based on input data. The model parameters 522 can weight and bias the nodes and connections of the model structure 520. For instance, when the model structure 520 is a neural network, the model parameters 522 can weight and bias the nodes in each layer of the neural networks, such that the weights determine the strength of the nodes and the biases determine the thresholds for the activation functions of each node. The model parameters 522, in conjunction with the activation functions of the nodes, determine how input data is transformed into desired outputs. The model parameters 522 can be determined and/or altered during training of the algorithm 516. For instance, model parameters 522 can be altered during incremental training to improve predictive value of the models.

The loss function engine 524 can determine a loss function, which is a metric used to evaluate the AI/ML model's performance during training. For instance, the loss function engine 524 can measure the difference between a predicted output of the AI/ML model and the actual output of the AI/ML model and is used to guide optimization of the AI/ML model during training to minimize the loss function. To that end, the loss function engine 524 can generate various loss function metrics described herein.

The optimizer 526 adjusts the model parameters 522 to minimize the loss function during training of the algorithm 516. In other words, the optimizer 526 uses the loss function/metrics generated by the loss function engine 524 as a guide to determine what model parameters lead to the most accurate AI/ML model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 526 used may be determined based on the type of model structure 520 and the size of data and the computing resources available in the data layer 502.

The regularization engine 528 regularization operations. Regularization is a technique that prevents over- and underfitting of the AI model. Overfitting occurs when the algorithm 516 is overly complex and too adapted to the training data, which can result in poor performance of the AI model. Underfitting occurs when the algorithm 516 is unable to recognize even basic patterns from the training data such that it cannot perform well on training data or on validation data. The optimizer 526 can apply one or more regularization techniques to fit the algorithm 516 to the training data properly, which helps constraint the resulting AI model and improves its ability for generalized application. Examples of regularization techniques include lasso (L1) regularization, ridge (L2) regularization, and elastic (L1 and L2 regularization). Incremental training techniques can be utilized to achieve an optimum fit level.

The application layer 508 describes how the AI/ML system 500 is used to solve problems or perform tasks. As described above, the application layer 508 can include the summarizer 121, lineage generator 122, code converter 124, code debugger 140, test data generator 152, and/or test script generator 154. The application layer 508 can include various user interfaces (e.g., as part of the application 172), such as GUIs and/or smart GUI elements (chat bots, prompt inputs, prompt generators).

Example Computing Systems

Figure 6:
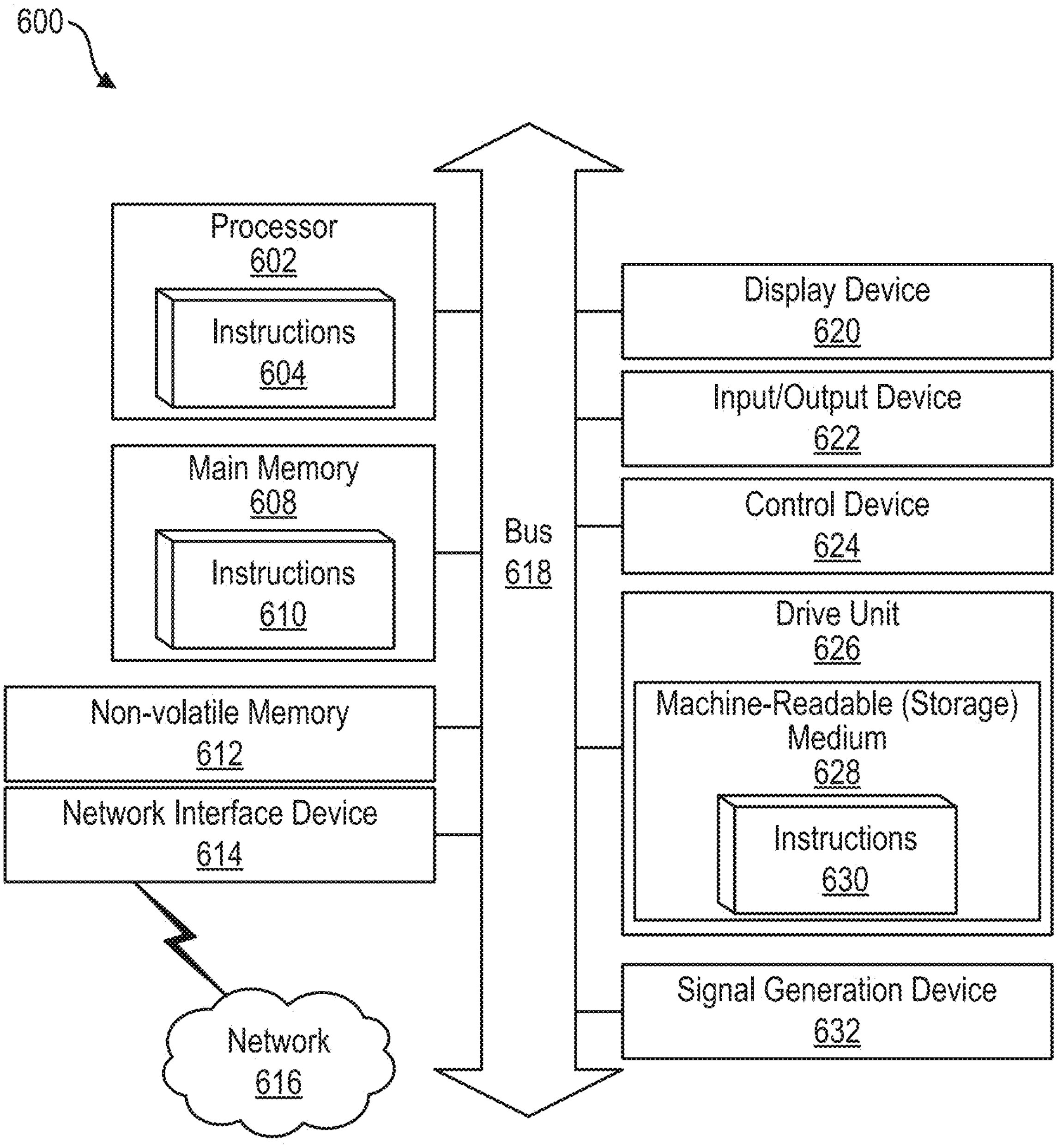
FIG. 6 is a block diagram showing some of the components typically incorporated in at least some of the computer systems and other devices on which the code generator operates in accordance with some implementations of the present technology.

FIG. 6 is a block diagram showing some of the components typically incorporated in at least some of the computer systems and other devices on which the code generator 105 operates in accordance with some implementations of the present technology. As shown, an example computer system 600 can include: one or more processors 602, main memory 608, non-volatile memory 610, a network interface device 614, video display device 620, an input/output device 622, a control device 624 (e.g., keyboard and pointing device), a drive unit 626 that includes a machine-readable medium 628, and a signal generation device 632 that are communicatively connected to a bus 618. The bus 618 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computer system 600 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 600. In some implementations, the computer system 600 can be an embedded computer system, a system-on-chip (SOC), a single-board computer system (SBC) or a distributed system such as a mesh of computer systems or include one or more cloud components in one or more networks. Where appropriate, one or more computer systems 600 can perform operations in real-time, near real-time, or in batch mode.

The network interface device 614 enables the computer system 600 to exchange data in a network 616 with an entity that is external to the computing system 600 through any communication protocol supported by the computer system 600 and the external entity. Examples of the network interface device 614 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 608, non-volatile memory 612, machine-readable medium 628) can be local, remote, or distributed. Although shown as a single medium, the machine-readable medium 628 can include multiple media (e.g., a centralized/distributed database and/or associated caches and servers) that store one or more sets of instructions 630. The machine-readable (storage) medium 628 can include any medium that is capable of storing, encoding, or carrying a set of instructions for execution by the computer system 600. The machine-readable medium 628 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 610, 630) set at various times in various memory and storage devices in computing device(s). When read and executed by the processor 602, the instruction(s) cause the computer system 600 to perform operations to execute elements involving the various aspects of the disclosure.

Example Computing Environments

Figure 7:
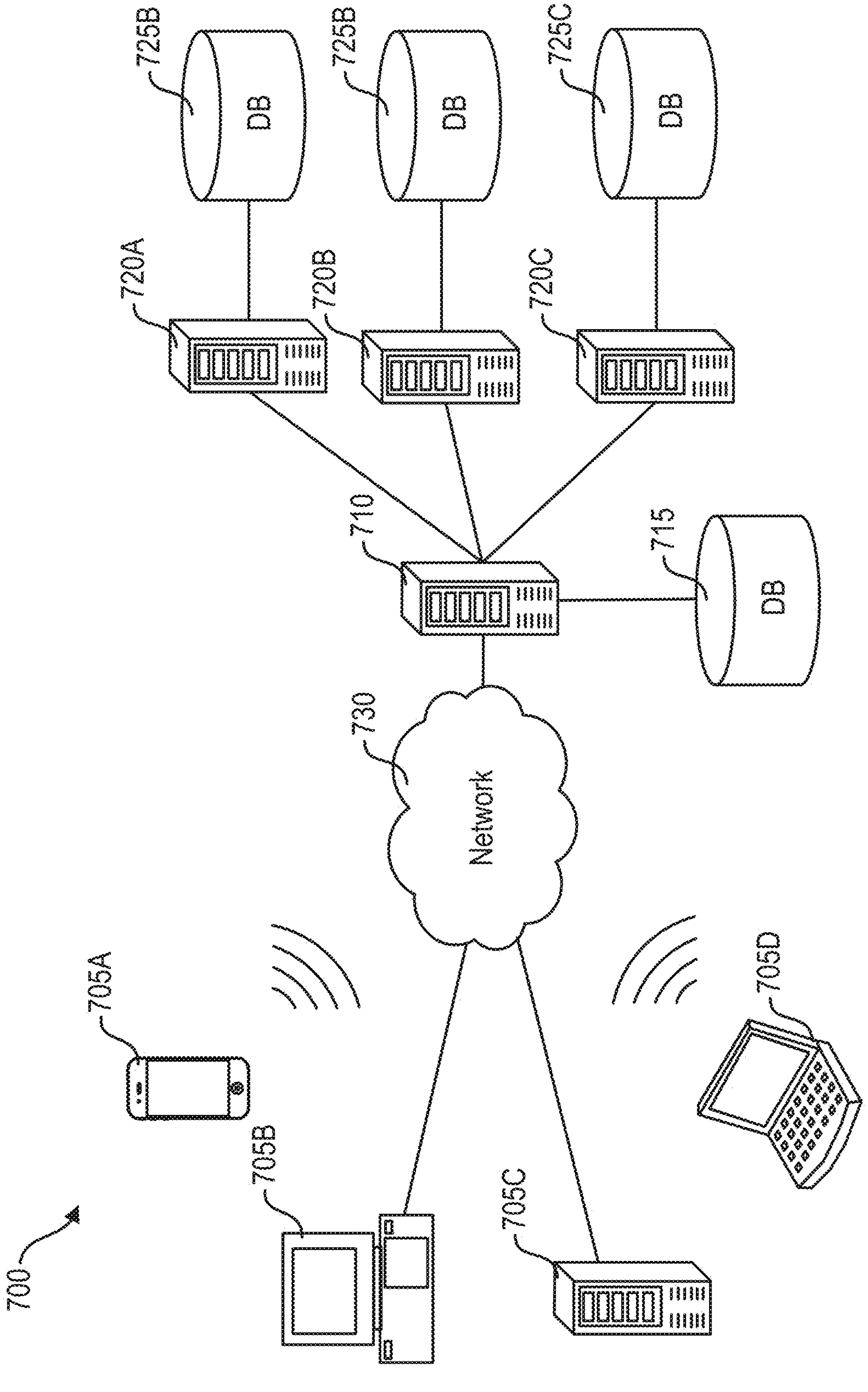
FIG. 7 is a system diagram illustrating an example of a computing environment in which the code generator operates in some implementations of the present technology.

FIG. 7 is a system diagram illustrating an example of a computing environment in which the code generator 105 operates in some implementations of the present technology. In some implementations, environment 700 includes one or more client computing devices 705A-D, examples of which can host the code generator 105 of FIG. 1. Client computing devices 705 operate in a networked environment using logical connections through network 730 to one or more remote computers, such as a server computing device.

In some implementations, server 710 is an edge server which receives client requests and coordinates fulfillment of those requests through other servers, such as servers 720A-C. In some implementations, server computing devices 710 and 720 comprise computing systems, such as the code generator 105 of FIG. 1. Though each server computing device 710 and 720 is displayed logically as a single server, server computing devices can each be a distributed computing environment encompassing multiple computing devices located at the same or at geographically disparate physical locations. In some implementations, each server 720 corresponds to a group of servers.

Client computing devices 705 and server computing devices 710 and 720 can each act as a server or client to other server or client devices. In some implementations, servers (710, 720A-C) connect to a corresponding database (715, 725A-C). As discussed above, each server 720 can correspond to a group of servers, and each of these servers can share a database or can have its own database. Databases 715 and 725 warehouse (e.g., store) information such as input images, sequences, maps, training data, weights, scores, metrics and their associated values, thresholds, code samples, prompts and/or prompt stubs, libraries and so forth. Though databases 715 and 725 are displayed logically as single units, databases 715 and 725 can each be a distributed computing environment encompassing multiple computing devices, can be located within their corresponding server, or can be located at the same or at geographically disparate physical locations.

Network 730 can be a local area network (LAN) or a wide area network (WAN), but can also be other wired or wireless networks. In some implementations, network 730 is the Internet or some other public or private network. Client computing devices 705 are connected to network 730 through a network interface, such as by wired or wireless communication. While the connections between server 710 and servers 720 are shown as separate connections, these connections can be any kind of local, wide area, wired, or wireless network, including network 730 or a separate public or private network.

Example Methods of Operation for a Code Migration Use Case

Figure 8:
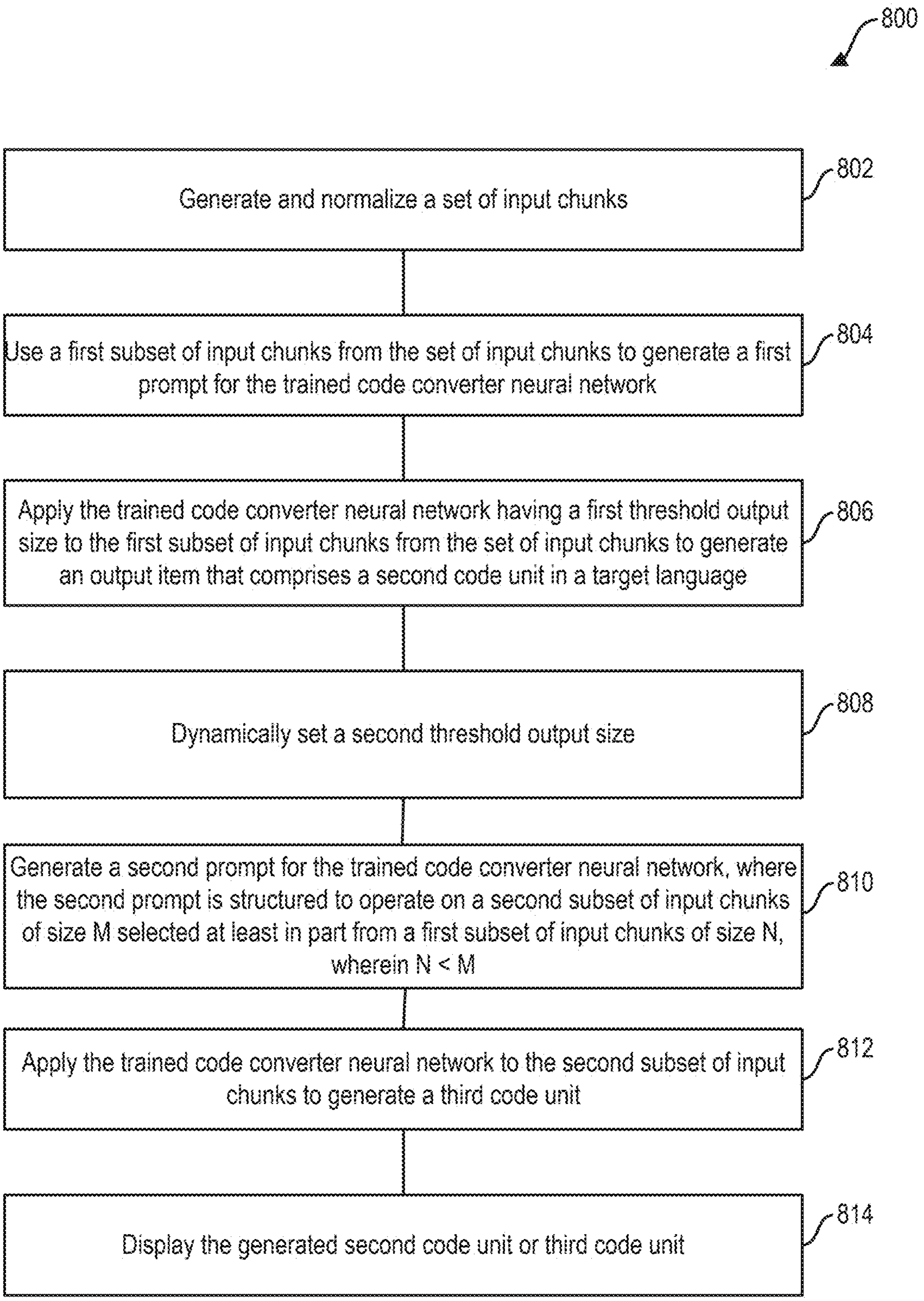
FIG. 8 is a flowchart depicting an example method of operation of the code generator in a code migration use case, in accordance with some implementations of the present technology.

FIG. 8 is a flowchart depicting an example method 800 of operation of the code generator 105 in a code migration use case, in accordance with some implementations of the present technology. In an example, at 802, the code generator 105 can generate a set of input chunks using a first code unit in a source language. A size of the input chunks can be normalized across the set of input chunks such that the size of the input chunks is substantially uniform and does not exceed a predetermined token limit for a trained code converter neural network. At 804, the code generator 105 can use a first subset of input chunks from the set of input chunks to generate a first prompt for the trained code converter neural network. In some implementations, the first prompt can be structured to preserve at least one of a code dependency, data dependency, code type, or sequence dependency. At 806, the code generator 105 can apply the trained code converter neural network to the first subset of input chunks from the set of input chunks to generate an output item that comprises a second code unit in a target language. The trained code converter neural network can generate output in conformance to a size threshold. In some implementations, in response to a determination that a size of the output item exceeds the size threshold, the code generator 105 can, at 808, dynamically reduce the size threshold and, at 810, generate a second prompt for the trained code converter neural network, where the second prompt is structured to operate on a second subset of input chunks of size M selected at least in part from a first subset of input chunks of size N, wherein N<M. At 812, the code generator 105 can apply the trained code converter neural network to the second subset of input chunks to generate a third code unit. At 814, the code generator 105 can cause a computing device to display the generated second code unit or third code unit.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative embodiments may employ differing values or ranges.

The teachings of the technology provided herein can be applied to other systems, not necessarily the system described above. The elements and acts of the various examples described above can be combined to provide further embodiments of the technology. Some alternative embodiments of the technology may include not only additional elements to those embodiments noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

We claim:

1. At least one non-transitory, computer-readable storage medium comprising instructions recorded thereon, the instructions, when executed by at least one processor of a code generator, causing the code generator to perform migration of computer code from a computer language to a different computer language by:

using a first code unit in a source language, generating a set of input chunks, wherein a size of the input chunks is normalized across the set of input chunks, and wherein the size of the input chunks does not exceed a predetermined token limit for a trained code converter neural network;

using a first subset of input chunks from the set of input chunks, generating a first prompt for the trained code converter neural network, wherein the first prompt is structured to preserve at least one of a code dependency, data dependency, code type, or sequence dependency in the first code unit;

applying the trained code converter neural network to the first subset of input chunks from the set of input chunks to generate an output item that comprises a second code unit in a target language, wherein the trained code converter neural network is configured to generate output in conformance to a size threshold;

in response to a determination that a size of the output item exceeds the size threshold, dynamically reducing the size threshold and generating a second prompt for the trained code converter neural network, wherein the second prompt is structured to operate on a second subset of input chunks of size M selected at least in part from a first subset of input chunks of size N, wherein N<M; and applying the trained code converter neural network to the second subset of input chunks to generate a third code unit; and causing a computing device to display the generated second code unit or third code unit.

2. The at least one non-transitory, computer-readable storage medium of claim 1, wherein the prompt includes a context reference that relates to a data dependency associated with a particular chunk.

3. The at least one non-transitory, computer-readable storage medium of claim 1, wherein the set of input chunks is an ordered set, the instructions further causing the code generator to generate the prompt to include the code dependency, the code dependency relating a particular chunk to an earlier chunk in the ordered set.

4. The at least one non-transitory, computer-readable storage medium of claim 1, wherein the first prompt is included in an ordered set of chain-of-thought prompts structured according to an automatically determined logic sequence in the first code unit.

5. The at least one non-transitory, computer-readable storage medium of claim 1, wherein the size of the output item refers to a length of an output item.

6. The at least one non-transitory, computer-readable storage medium of claim 1, wherein the size of the output item is determined by performing a token count on a set of output tokens included in the output item.

7. The at least one non-transitory, computer-readable storage medium of claim 1, wherein the instructions further comprise compressing the first code unit prior to applying the trained code converter neural network to the first subset of input chunks to generate the second code unit.

8. The at least one non-transitory, computer-readable storage medium of claim 7, wherein compressing the first code unit comprises consolidating at least two chunks in the first subset of input chunks in response to a determination that the at least two chunks include repeating code units.

9. The at least one non-transitory, computer-readable storage medium of claim 1, wherein the instructions further comprise:

generating a maintainability index for the second code unit, wherein the maintainability index is a factored score based at least on a number of lines of code in the second code unit or the third code unit; and based on the maintainability index, applying an optimization operation to the first subset of input chunks to generate an optimized first subset of input chunks; and applying the trained code converter neural network to the optimized first subset of input chunks to generate a fourth code unit in the target language, wherein the fourth code unit is generated in accordance to a target maintainability index.

10. The at least one non-transitory, computer-readable storage medium of claim 9, wherein the optimization operation includes normalizing at least one of code in the first subset of input chunks or data referenced by the code in the first subset of input chunks.

11. The at least one non-transitory, computer-readable storage medium of claim 1, wherein the instructions further comprise generating, using the set of input chunks, a visual representation of data lineage referenced in the first code unit.

12. The at least one non-transitory, computer-readable storage medium of claim 11, wherein the data lineage is determined by ordering and sequentially traversing the set of input chunks.

13. The at least one non-transitory, computer-readable storage medium of claim 1, wherein the instructions further comprise generating, using the set of input chunks, natural-language summary of computer-based operations in the first code unit.

14. The at least one non-transitory, computer-readable storage medium of claim 1, wherein the instructions further comprise:

generating a first sensibility score for the first code unit and a second sensibility score for the second code unit; and based on a comparison of the first sensibility score and the second sensibility score, generating and displaying a code migration quality indicator.

15. The at least one non-transitory, computer-readable storage medium of claim 1, wherein the instructions further comprise:

generating a first sensibility score for the second code unit;

generating a debugging summary and displaying a debugging summary alongside the second code unit;

in response to detecting a set of edits performed to the second code unit, generating a second sensibility score for the edited second code unit; and based on a comparison of the first sensibility score and the second sensibility score, generating and displaying a code migration quality indicator.

16. A computing system comprising at least one processor and at least one non-transitory, computer-readable storage medium comprising instructions recorded thereon, the instructions, when executed by the at least one processor, causing a code generator of the computing system to perform migration of computer code from a computer language to a different computer language by:

using a first code unit in a source language, generating a set of input chunks, wherein a size of the input chunks is normalized across the set of input chunks, and wherein the size of the input chunks does not exceed a predetermined token limit for a trained code converter neural network;

using a first subset of input chunks from the set of input chunks, generating a first prompt for the trained code converter neural network, wherein the first prompt is structured to preserve at least one of a code dependency, data dependency, code type, or sequence dependency in the first code unit;

applying the trained code converter neural network to the first subset of input chunks from the set of input chunks to generate an output item that comprises a second code unit in a target language, wherein the trained code converter neural network is configured to generate output in conformance to a size threshold;

in response to a determination that a size of the output item exceeds the size threshold, dynamically reducing the size threshold and generating a second prompt for the trained code converter neural network, wherein the second prompt is structured to operate on a second subset of input chunks of size M selected at least in part from a first subset of input chunks of size N, wherein $N<M$; and applying the trained code converter neural network to the second subset of input chunks to generate a third code unit; and causing a computing device to display the generated second code unit or third code unit.

17. The computing system of claim 16, wherein the prompt includes a context reference that relates to a data dependency associated with a particular chunk.

18. The computing system of claim 16, wherein the set of input chunks is an ordered set, the instructions further causing the code generator to generate the prompt to include the code dependency, the code dependency relating a particular chunk to an earlier chunk in the ordered set.

19. The computing system of claim 16, wherein the first prompt is included in an ordered set of chain-of-thought prompts structured according to an automatically determined logic sequence in the first code unit.

20. A computer-implemented method for causing a code generator to perform migration of computer code from a computer language to a different computer language by:

using a first code unit in a source language, generating a set of input chunks, wherein a size of the input chunks is normalized across the set of input chunks, and wherein the size of the input chunks does not exceed a predetermined token limit for a trained code converter neural network;

using a first subset of input chunks from the set of input chunks, generating a first prompt for the trained code converter neural network, wherein the first prompt is structured to preserve at least one of a code dependency, data dependency, code type, or sequence dependency in the first code unit;

applying the trained code converter neural network to the first subset of input chunks from the set of input chunks to generate an output item that comprises a second code unit in a target language, wherein the trained code converter neural network is configured to generate output in conformance to a size threshold;

in response to a determination that a size of the output item exceeds the size threshold, dynamically reducing the size threshold and generating a second prompt for the trained code converter neural network, wherein the second prompt is structured to operate on a second subset of input chunks of size M selected at least in part from a first subset of input chunks of size N, wherein N<M; and applying the trained code converter neural network to the second subset of input chunks to generate a third code unit; and causing a computing device to display the generated second code unit or third code unit.

* * * * *